United States Patent
Nachman et al.

(10) Patent No.: US 6,894,811 B1
(45) Date of Patent: May 17, 2005

(54) INTERFACE CIRCUIT FOR UTILIZING A FACSIMILE COUPLED TO A PC AS A SCANNER OR PRINTER

(76) Inventors: Bruce Nachman, deceased, late of Wayne, PA (US); by Marvin Nachman, legal representative, 315 Saybrook Rd., Villanova, PA (US) 19085

( * ) Notice: Subject to any disclaimer, the term of this patent is extended or adjusted under 35 U.S.C. 154(b) by 0 days.

(21) Appl. No.: 08/669,056

(22) Filed: Jun. 24, 1996

Related U.S. Application Data

(63) Continuation-in-part of application No. 08/226,278, filed on Apr. 11, 1994, now Pat. No. 5,530,558.

(51) Int. Cl.[7] .............................. H04N 1/32; H04N 1/04
(52) U.S. Cl. ........................ 358/442; 358/468; 358/474; 379/100.01
(58) Field of Search ................................ 358/442, 468, 358/443, 400, 401, 434–437, 474, 1.13, 1.15, 440, 1.6; 379/100, 251, 252, 375, 93, 100.15, 100.01, 100.02, 100.06, 100.05, 100.13

(56) References Cited

U.S. PATENT DOCUMENTS

| | | | | | |
|---|---|---|---|---|---|
| 4,821,312 A | * | 4/1989 | Horton et al. | ............... | 358/442 |
| 5,452,106 A | * | 9/1995 | Perkins | ........................ | 358/442 |
| 5,530,558 A | * | 6/1996 | Nachman | ..................... | 358/442 |
| 5,608,546 A | * | 3/1997 | Nakamura et al. | .......... | 358/442 |
| 5,823,689 A | * | 10/1998 | Nehowig et al. | .............. | 400/83 |
| 6,134,017 A | * | 10/2000 | Schlank et al. | ............. | 358/1.15 |

* cited by examiner

*Primary Examiner*—Cheukfan Lee

(57) ABSTRACT

Apparatus for interfacing a conventional facsimile machine with a PC enabling the use of the facsimile machine as a scanner or printer. A first switch assembly selectively couples the PC modem and facsimile machine either to independent telephone lines in a normal mode or to one another in a scan/print mode. A manually operated switch assembly is depressed for a brief interval sufficient to activate a ringing circuit which converts DC power from a small battery source to a 20 Hz sine wave of 90 volt amplitude and applies the sine wave signal to the PC to cause the PC or facsimile to enter into a scan or print mode, respectively. The manually operable switch is then released to apply a constant current to the facsimile machine to simulate an off-hook condition. A facsimile machine start button is then operated to start the facsimile machine which scans documents provided therein and transmits the scanned data in a conventional facsimile transmission format or activate the PC to transmit a fax in conventional facsimile transmission format to utilize the facsimile machine as a printer. The PC may be equipped with a suitable software program for converting non-graphic, i.e. such as word-type information into a binary format suitable for use in word processing applications and may store the data in a memory for subsequent use. An automatic circuit may be provided to initiate a scanning or printing mode responsive to receipt of a unique number received from either the facsimile machine or the PC, thus eliminating the need for switches.

20 Claims, 11 Drawing Sheets

INTERFACE CIRCUIT FOR UTILIZING A FACSIMILE COUPLED TO A PC AS A SCANNER OR PRINTER

This application is a continuation-in-part of application Ser. No. 08/226,278, filed Apr. 11, 1994, now U.S. Pat. No. 5,530,558.

FIELD OF THE INVENTION

The present invention relates to interfacing a facsimile with a PC and more particularly to an interface circuit of highly simplified design and including a novel ringing circuit capable of generating a sine wave of a given amplitude and frequency from a small, portable DC battery or 9V DC power supply.

BACKGROUND OF THE INVENTION

As is well known in the art, a conventional facsimile scans documents and transmits the scanned information through a modem in a standard facsimile format to a remote facsimile which receives the transmitted data by a modem and converts the transmitted data into a form for printing a document which is a replica of the document scanned by the transmitting facsimile.

Scanning and printing devices especially adapted for use with PCs (i.e. personal computers) are relatively expensive devices typically costing many hundreds of dollars to as much as several thousands of dollars for applications requiring character recognition capabilities.

It has been recognized that conventional facsimile machines may be utilized as scanners or printers for PCs. However, the interface devices presently available are both complicated and expensive and typically require a microprocessor which further tends to increase both cost and circuit complexity.

OBJECT OF THE INVENTION

It is, therefore, a principal object of the present invention to provide a circuit for interfacing a PC and a facsimile to enable the facsimile to be utilized as a scanner or a printer for a PC and to accomplish all of the objectives of a scanner or a printer in a simple straightforward manner through the use of a circuit of highly simplified design and low cost.

BRIEF DESCRIPTION OF THE INVENTION

The present invention achieves all of the above as well as other objectives through apparatus which is characterized by comprising first switch means capable of selectively coupling a PC modem and a facsimile modem to independent telephone lines when in a non-scanning/printing mode and for decoupling the PC and facsimile modems from the telephone lines and coupling these modems to one another when placed in a scanning/printing mode.

Second manually operable switch means activates a novel ringing circuit which generates a sine wave of appropriate amplitude and frequency and applies this ringing circuit to the PC modem, when used as a scanner or to the facsimile when being used as a printer, causing the PC or facsimile machine to respond to the simulated transmit request.

Release of the circuitry operating button causes the interface circuitry to apply an off-hook condition to the facsimile. Document scanning or printing is initiated by pressing the facsimile start button or the start button provided as part of the PC or by a program step integrated into the PC as part of a print mode (selecting the facsimile as the output device for printing). Transmitted data may be directly stored in a PC memory. Documents incorporating alphanumeric data may be converted by a software program incorporated into the PC.

The ring generating circuit responsive to pressing of the operating button generates a transmit request signal by converting the low voltage from a DC source into a 20 cycle sine wave of 90 volt amplitude through the employment of a pulse generating circuit coupled to phase delay means and applying phase delayed and undelayed pulses to a transistorized switching circuit for selectively applying positive DC voltage to opposing inputs of a step-up transformer which applies a boosted sinusoidal ring signal to the PC modem, the ring generating circuit generating a ringing signal of the appropriate amplitude and frequency in a highly simplified and inexpensive manner. Since operation of the ringing circuit is completed in less than two seconds, a battery, if used, will have an extremely long operating life. Alternatively, if a 9V DC power source is used the battery is not required at all.

The simple, straightforward operation of only three switches eliminates the need for complicated, expensive and typically microprocessor-based circuitry.

BRIEF DESCRIPTION OF THE FIGURES

The above, as well as other objects of the present invention, will become apparent upon reading the accompanying description and drawings in which.

DETAILED DESCRIPTION OF THE INVENTION AND PREFERRED EMBODIMENTS THEREOF

Figure 1:
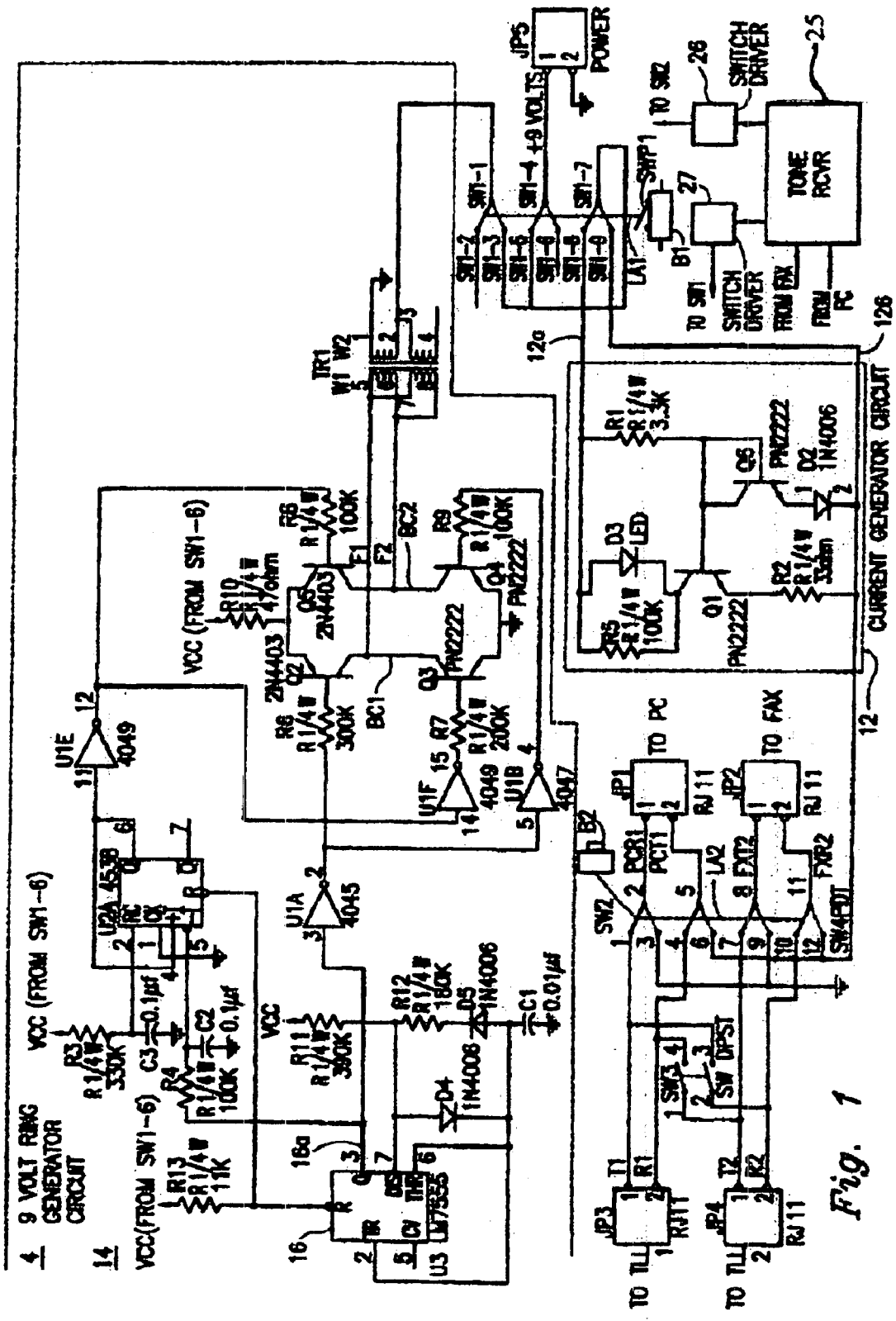
FIG. 1 is a circuit diagram of the interface circuitry of the present invention which enables a PC to utilize a conventional facsimile as a sophisticated scanner or printer.

FIG. 1 shows an interface circuit 10 embodying the principles of the present invention and being comprised of a switch assembly SW2 which is a four-pole double-throw switch having four movable switch arms SW2-2, SW2-5, SW2-8, and SW2-11, each cooperating with a pair of stationary contacts, as shown. For example, and for simplicity, note that switch arms SW2-2 is switchable between stationary contacts SW2-1 and SW2-3.

Movable switch arms SW2-2, SW2-5, SW2-8 and SW2-11 are all ganged to operate in unison as shown by common operating button B2 coupled to the switch arms through a linkage arm LA2 shown in schematic fashion as a dotted line. The switch is designed so that the switch arms are retained in the positions to which they are moved.

The switch arms are arranged in pairs, switch arms SW2-2 and SW2-5 selectively coupling a modem of a PC (not shown for purposes of simplicity) to either a first telephone line #1 through jumper JP3 or directly to a local facsimile machine (not shown for purposes of simplicity) through a jumper terminal JP2.

In a similar fashion, a pair of switch arms SW2-8 and SW2-11 selectively couple the local facsimile machine through jumper JP2 to either a separate telephone line #2 (through jumper JP4) or to the modem of the PC.

A double-pole single-throw switch SW3 is provided to couple either the local facsimile machine or the PC modem to a single telephone line or alternatively, disconnects the PC modem and facsimile machine from the common telephone line. For example, in applications where both the local facsimile and the PC each have an independent, dedicated telephone line, switch SW3 remains open. In applications where only a single telephone line is provided, both PC and the local facsimile may share the single telephone line by gaining access thereto in a staggered manner.

Switch SW1 which is a three-pole, double-throw switch, comprises three movable switch arms SW1-1, SW1-4 and SW1-7, each movable switch arm cooperating with a pair of stationary switch arms.

Movable switch arm SW1-1 selectively couples the output terminal of the pair of secondary windings W2 of a step-up transformer TR1 either to stationary terminal SW1-2, which isolates the output of the transformer TR1 from the operating circuitry, or stationary contact SW1-3 which couples the secondary winding W2 of transformer TR1 through movable switch arm SW1-7 and stationary contact SW1-9 simultaneously to stationary contacts SW2-6 and SW2-12 of four-pole double-throw switch SW2 for simultaneous connection to the PC modem and the local facsimile, when switch arms SW2-5 and SW2-11 respectively engage stationary contacts SW2-6 and SW2-12.

Movable switch arm SW1-4 selectively couples a small nine volt (9V) DC source (through jumper J5) to either stationary switch arm SW1-5 for coupling nine volt (9V) DC to a current generator circuit 12 or alternatively coupling nine volt (9V) DC to stationary terminal SW1-6 which in turn provides DC power to the nine volt (9V) ring generator circuit arranged within the dotted region as shown.

Current generator circuit 12 is comprised of resistors R1, R2 and R5, transistors Q1 and Q6, diode D2 and LED-type diode D3 which are connected in the manner shown to provide a constant current which simulates an off-hook signal, utilized in the manner to be more fully described hereinbelow. Resistor R2 serves as a current limiting resistor. LED D3 lights to denote operation of the constant current generator.

Ring generator circuit 14, which is utilized to generate a 20 Hz sine wave of a 90 volt amplitude, comprises a 555-type timing circuit 16 which, when activated by a nine volt DC input, applied to timer 16 through terminal VCC and resistor R13, provides a pulse train of equal width, positive-going pulses at a pulse rate of approximately 20 Hz at its output 16a.

The pulse train generated by the 555 timer 16 is simultaneously applied to the input of inverter U1A whose output is simultaneously coupled to the base electrodes of transistors Q2 and Q4, through resistor R6 and through inverter U1B and resistor R9.

The pulse train, as was set forth hereinabove, is simultaneously coupled to the -T input of a one-shot multivibrator operating as a phase delay circuit and whose Q output is coupled to the input of inverter U1E. The Q output of one-shot multivibrator U2A provides a phase delayed pulse which is coupled through the output of inverter U1E simultaneously to the base of transistor Q5 through resistor R8 and to the base of transistor Q3 through inverter U1F and resistor R7. Transistors Q2–Q5 and resistors R6–R9, together with resistor RIO, form a full bridge switching circuit which is powered by the nine volt (9V) DC source applied to the terminal VCC to provide drive current sufficient to drive transformer TR1, comprised of a pair of primary windings W1 and a pair of secondary windings W2, to generate a sine wave output. The pair of primary windings W1 and secondary windings W2 are coupled in parallel and the windings are arranged to provide a step-up transformer to magnify the input voltage preferably by ten to one (10:1), generating the desired output voltage which, in the present application, is a 20 Hz output of 90 volt amplitude with 15 mils of current from a nine volt (9V) DC, 150 mils current source. If desired, the frequency, amplitude and current of the circuit can be changed by selecting different component values for the passive elements. The component values chosen in the present invention have been selected to generate a signal which reproduces a standard bell ring signal employed in a conventional transmission between remote facsimile machines. The branch circuits BC1 and BC2 of the bridge circuit are alternately rendered conductive to alternately apply a positive voltage to opposing inputs of the input windings W1 for generating a sine wave from the positive-going pulses produced by timer circuit 16. The two input windings W1 are coupled in parallel as are the output windings W2.

The bell ring signal is selectively supplied through movable switch arm SW1-1 of the three-pole, double-throw switch SW1 described hereinabove.

The operation of the interface circuit of the present invention is as follows:

Assuming that the local facsimile is desired to be operated in combination with the PC and to function as a scanner, the switch SW2 is moved from the normal position, in which the movable switch arms are shown in solid line fashion, to the dotted line position simultaneously disconnecting the PC modem and the local facsimile from the telephone lines and directly connecting the PC receive line, PCR1 to ground and the PC transmit line PCT1 directly to stationary contact SW1-9. The local facsimile transmit line FXT2 is directly connected to ground and the facsimile receive line FXR2 is connected in common with line PCT1 to stationary contact SW1-9 of switch SW1. Switch SW3 may be either in the open or the closed position when switch SW2 is moved to the scan mode.

Switch SW1 is operated by pressing button B1 which is ganged to the movable switch arms SW1-1, SW1-4 and SW1-7 by a common linkage arm represented schematically by dotted line LA1. A biasing member or spring SWP1 normally biases the movable switch arms to the solid line position shown in Figure. By depressing switch button B1, the switch arms SW1-1, SW1-4 and SW1-7 are simultaneously moved to the dotted line positions shown in FIG. 1. Button B1 is maintained in the depressed position for a period preferably between one and two seconds. In the dotted line position, the nine volt (9V) DC source is coupled through switch arm SW1-4 and stationary terminal SW1-6 to the VCC terminals of ring generator circuit 14, producing a 20 Hz sine wave of 90 volt amplitude and a current of 15 mils at the secondary windings W2, which is applied to the PC line PCT1 through SW1-1, SW1-3, SW1-7, SW1-9, 126, SW2-6 and SW2-5, simulating what the PC believes is a request by a "remote" facsimile to transmit data thereto. The PC, which may be any type of computer (including but not limited to an Apple Macintosh, IBM PC, PCAT or PCXT) is provided with either an internal or external group III facsimile interface board, and shifts to a receive mode for receiving what appears to the PC to be a facsimile transmission from a "remote" facsimile machine.

After holding the button B1 depressed for a time which need not exceed approximately two seconds, button B1 is released causing the nine volt (9V) DC source to be coupled to input 12a of current generator circuit 12, which circuit applies the constant current to the facsimile receive line FXR2 to create what appears to the facsimile machine to be an off-hook condition. Simultaneously therewith, LED D3 lights indicating that the current generator circuit is presently in operation.

The local facsimile machine recognizes the constant current as representative of an off-hook condition preparing the local facsimile machine for transmission.

Thereafter, the conventional start button of the facsimile machine (not shown for purposes of simplicity) is pressed to start communication of the data scanned by the local facsimile machine from a document (or documents) placed within the facsimile machine document input (also not shown for purposes of simplicity).

The facsimile machine may be either a group I, group II, or group III machine, although optimum document resolution can be obtained through the use of a group III facsimile machine.

The conventional PC can store the transmitted data in its memory as a "picture" the resolution of the picture being 200 by 100 pixels for old facsimile machines, 200 by 200 pixels for standard facsimile machines and 400 by 400 pixels for new facsimile machines. Alternatively, a conventional OCR software package such as, for example, a CAERE OCR program available from Bitsoftware may be employed. Many alternative OCR software packages may be utilized to convert the "picture" transmitted by the facsimile machine to binary character form for word processing use or the like.

Operation of the facsimile machine in combination with the PC wherein the facsimile machine operates as a printer is as follows:

The ring generating circuit is not required to be operated in this mode and in applications where a facsimile machine is interfaced with a PC for use only as a printer, the ring generating circuit and the cooperating spring bias switch may be eliminated.

Switch SW2 shown in FIG. 1 is moved from the solid line to the dotted line position decoupling the PC and facsimile machine from the telephone lines and coupling the PC and facsimile machine together.

Switch SW1 is operated to power the current generator circuit 12 causing both the PC and the facsimile machine to see an off-hook condition.

The computer (PC) is operated either by providing a switch such as a push button switch (not shown for purposes of simplicity) to enter into a standard protocol with the facsimile machine and thereafter to transmit information in standard facsimile machine format. The facsimile machine senses that it is communicating with a remote facsimile machine and creates a document in accordance with the data received from the PC in "pixel" form. The PC may be provided with a standard program having a print mode in which the facsimile machine is identified in the printing routine as the specific output device being utilized during such a print mode. Upon completion of printing mode, switch SW2 may be returned to the solid line position decoupling the PC from the facsimile machine and recoupling the PC and facsimile modems to their associated telephone lines.

FIGS. 2a–2h show various arrangements in which the present invention may be utilized.

Figure 2A:
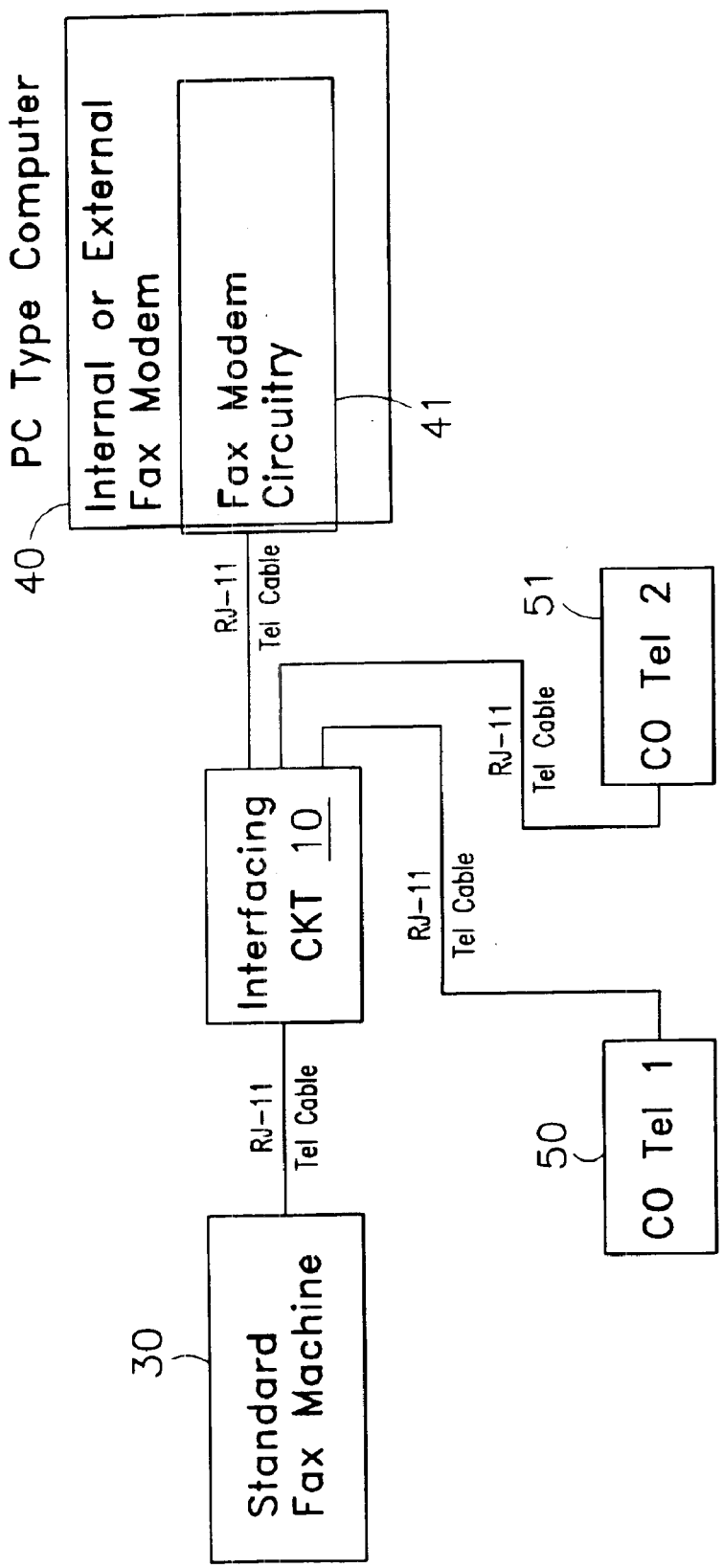
FIGS. 2a–2i show simplified block diagrams of various system arrangements employing the circuitry of the present invention.

Noting, for example, FIG. 2a, the circuitry 10 of the present invention is coupled between a standard facsimile machine 30, a PC-type computer 40 having a facsimile modem circuitry 41 and central office telephone lines 50 and 51. In the arrangement shown in FIG. 2a, the facsimile modem circuitry may be either internal or external to the PC-type computer 40.

Figure 2B:
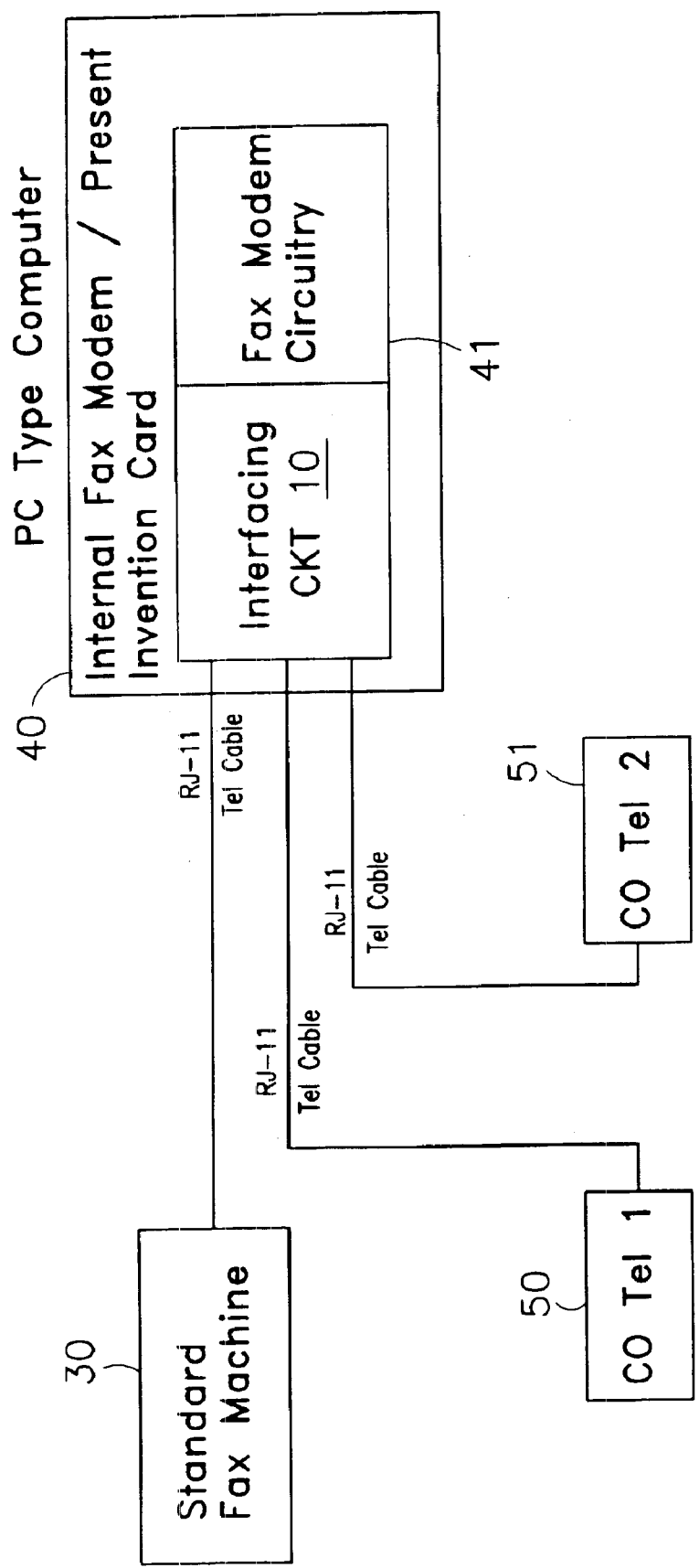

FIG. 2b shows another alternative embodiment in which the circuitry of the present invention is incorporated into the PC-type computer and may be arranged on its own printed wiring board or on a printed wiring board which is common to the circuitry 10 of the present invention and the facsimile modem circuitry 41. The arrangement of FIG. 2b is otherwise the same as that shown in FIG. 2a. The circuit 10 shown in FIG. 2b is provided with three RJ-11 telephone cable connections for respective connection with the facsimile machine 30 and telephone lines 50 and 51. If only one additional telephone cable is provided, the standard facsimile machine 40 and the internal facsimile modem 41 may share that cable.

Figure 2C:
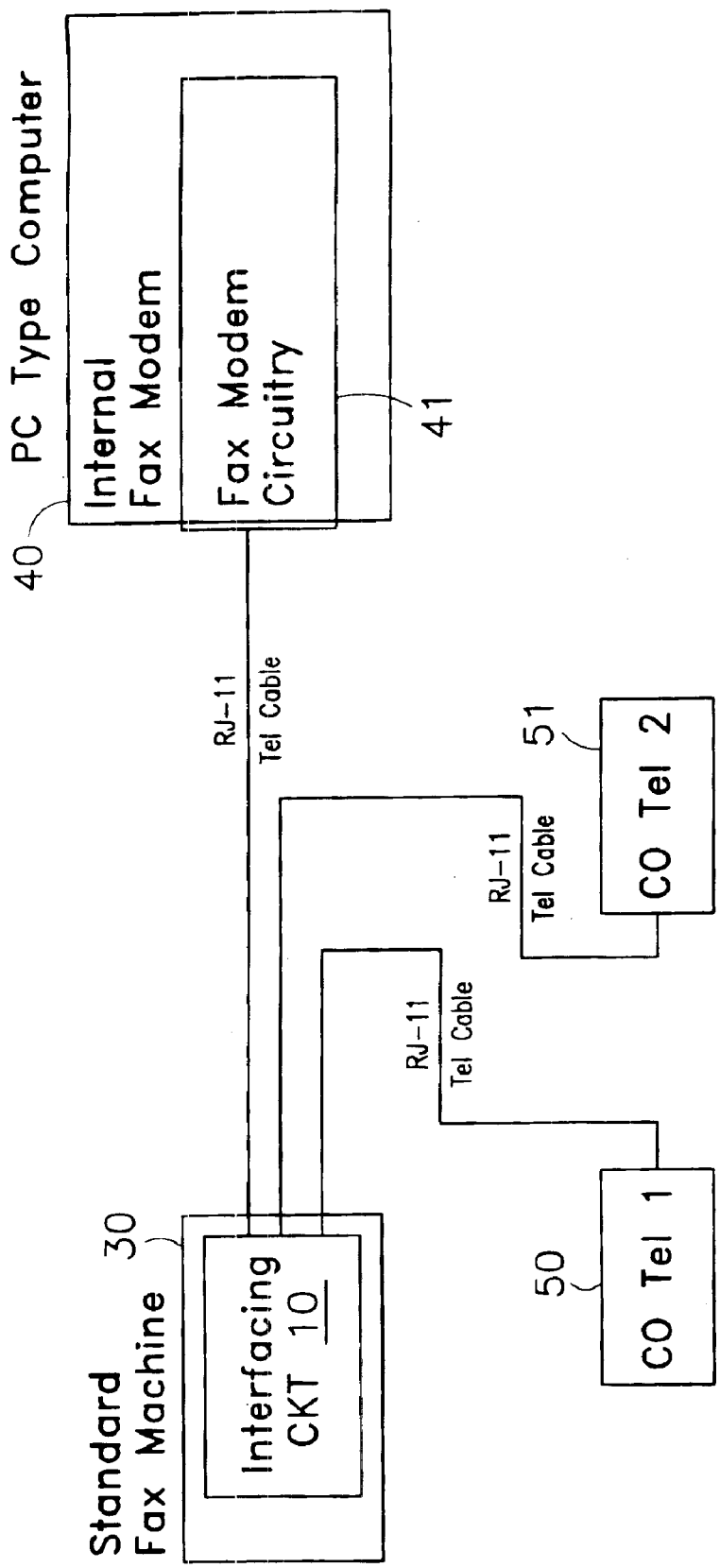

FIG. 2c shows another alternative arrangement in which the circuitry 10 of the present invention is integrated into the standard facsimile machine 30. The operation of the arrangement of FIG. 2c is otherwise similar to those shown in FIGS. 2a and 2b.

Figure 2D:
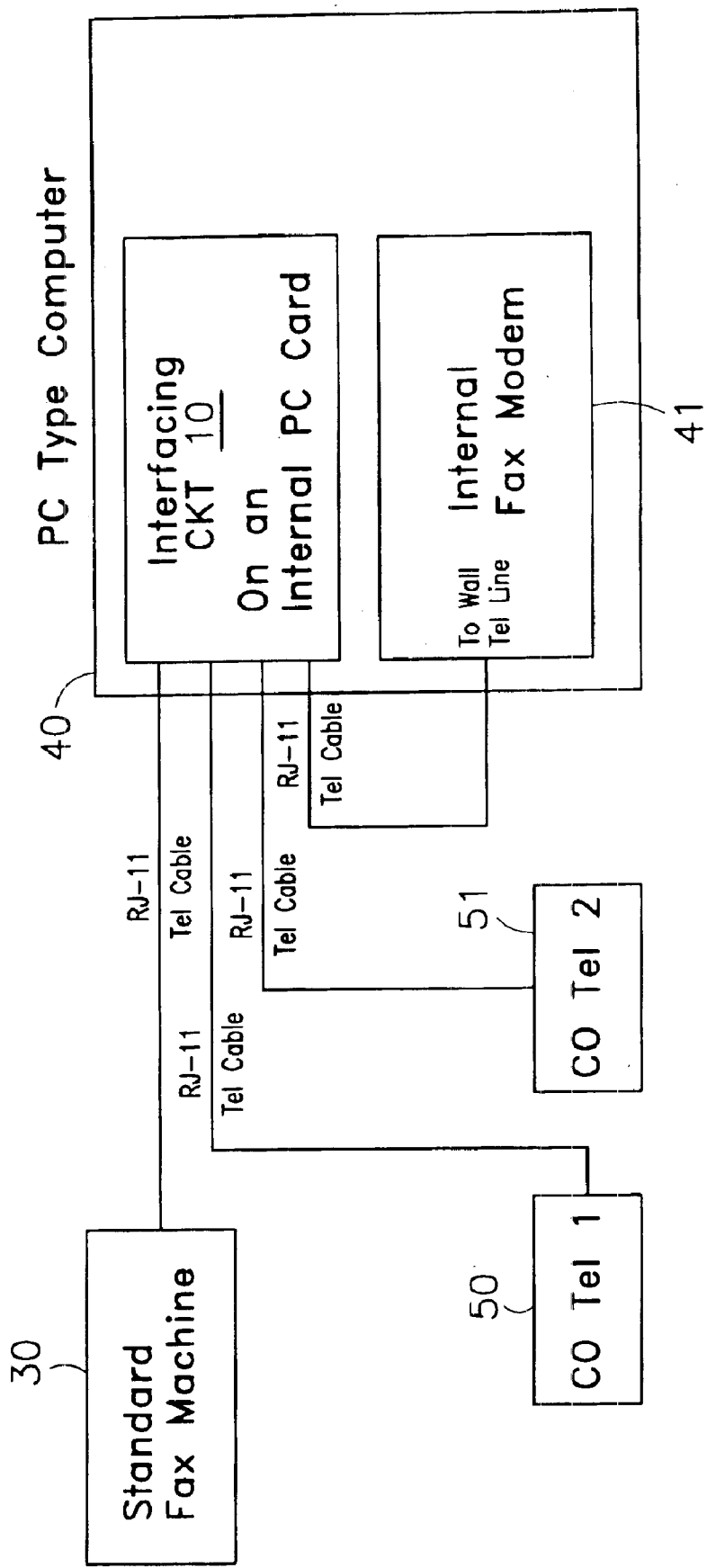

FIG. 2d shows an arrangement in which the circuitry 10 of the present invention is mounted upon its own printed wiring board and is arranged within the PC-type computer 40 and is electrically connected to the internal facsimile modem 41 by an external RJ-11 cable as shown. The operation is otherwise the same as the embodiments of FIGS. 2a–2c described hereinabove.

The circuitry 10 of the present invention may alternatively be placed upon a printed circuit card of approximately a credit card size for insertion in a bus slot provided in present-day PCs enabling the circuit on the printed circuit card, inserted into a slot provided along the exterior of the PC, to be coupled to a PCMCIA bus which is an additional bus that may be addressed by the PC.

Figure 2E:
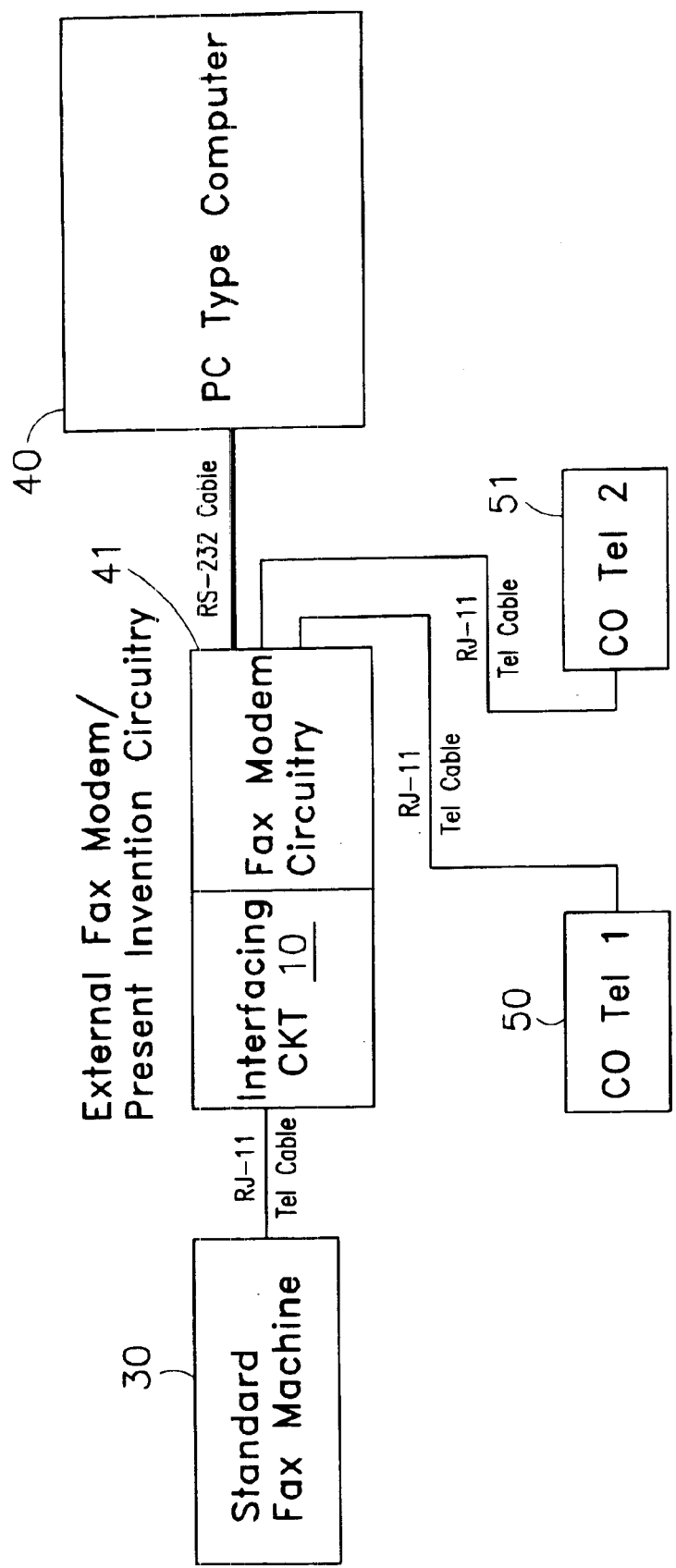

FIG. 2e shows still another arrangement in which the PC-type computer 40 is coupled to external facsimile modem circuitry 41, for example, through an RS-232 cable. The facsimile machine interfaces to the external facsimile modem 41 through circuitry 10 by way of an RJ-11 telephone cable. When in the normal mode of operation, circuitry 10 interfaces central office telephone lines 50 and 51 through the RJ-11 telephone cables, as shown. Cable 50 may be employed for standard facsimile machine telephone communications while telephone line 51 is used for the external facsimile modem circuitry. If only one central office telephone line is available, line 50 may be shared in the manner previously described.

Figure 2F:
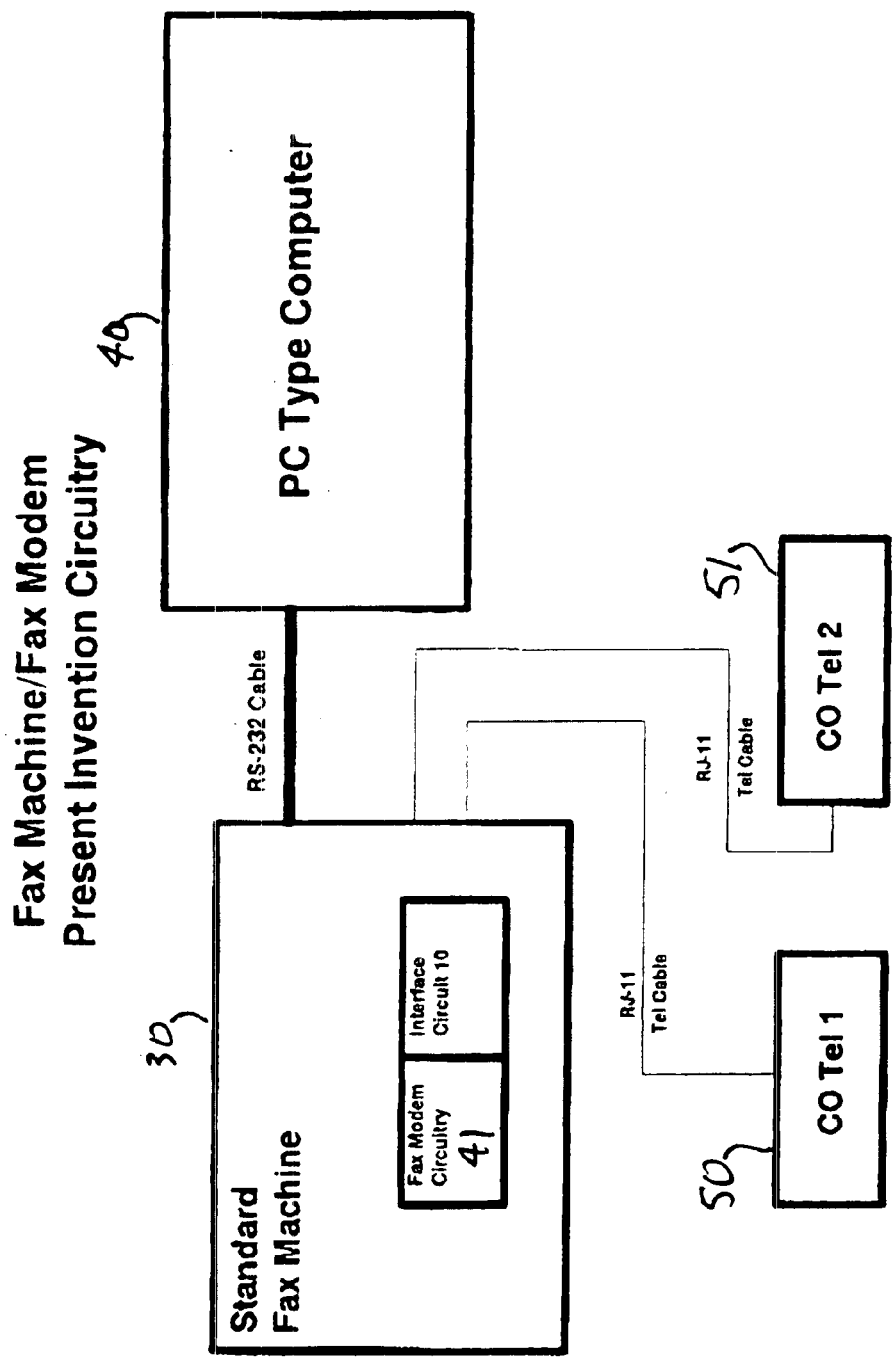

FIG. 2f shows an arrangement in which interface circuit 10 is internal to the facsimile machine. PC-type computer 40 is coupled to the facsimile modem circuitry 41 and interface circuit 10 through an RS-232 cable. When in the normal mode of operation, circuitry 10 interfaces the central office telephone lines 50 and 51 through RJ-11 telephone cables, as shown. Cable 50 may be employed for standard facsimile machine telephone communications while telephone line 51 is used for the external facsimile modem circuitry. If only one central office telephone line is available, line 50, for example, may be shared in the manner previously described. The arrangement of FIG. 2f is used with PC's which do not have a fax modem installed. When interface 10 is installed internal to the facsimile, the fax modem of the fax machine incorporates many of the functions of circuit 10, through integration of the already existing circuitry components of the fax modem.

The present invention may be employed with telephone systems having digital signal processing. FIG. 2h, which is similar to FIG. 2f, and which shows like circuits designated with like numerals, further includes an interface 60 for digital signal processing. The send and receive options required for scanning and printing are provided by interface 60, which may, for example, be a chip set such as PEB 2091 N-V4.4 and EPB 2186 N-V4.4, manufactured by Siemens. Any other chip set having similar operating characteristics may be employed. As other digital signal formats come into use, such as ADSL (Asymmetric Digital Subscriber Line) HDSL (High Bit Rate Digital Subscriber Line), or the like, a chip set for handling such formats may be substituted for interface 60.

Figure 2G:
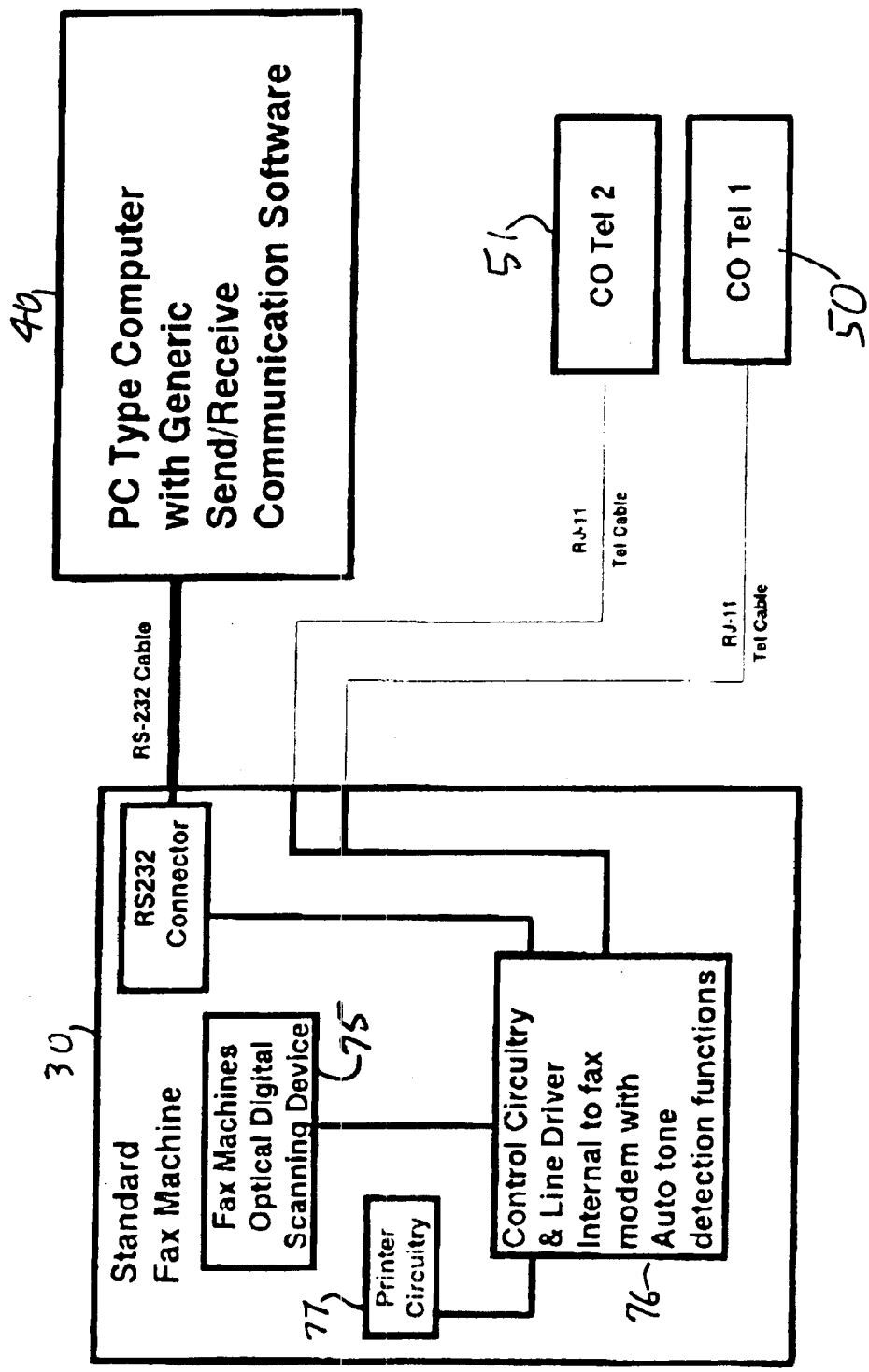
Figure 2H:
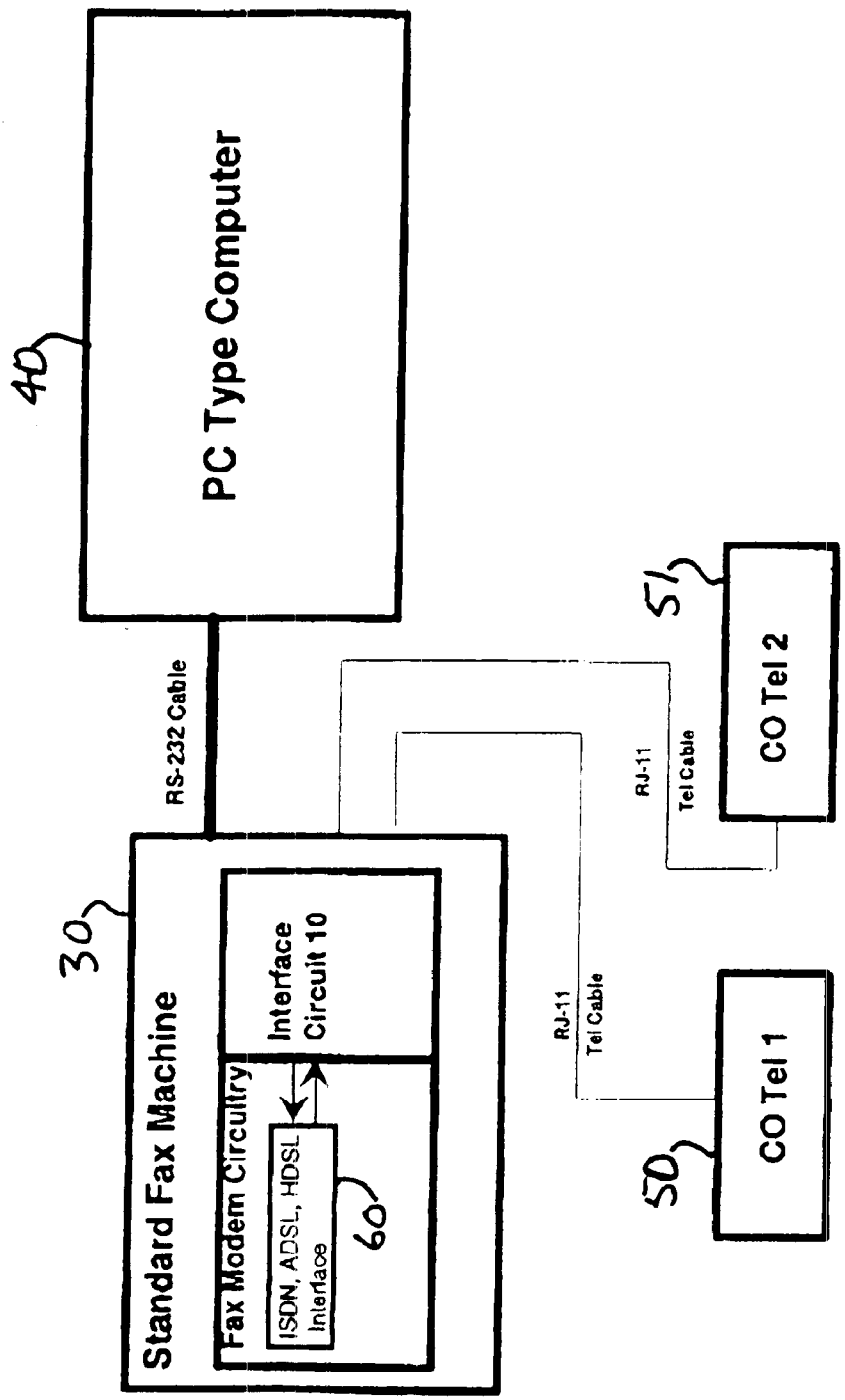
Figure 2I:
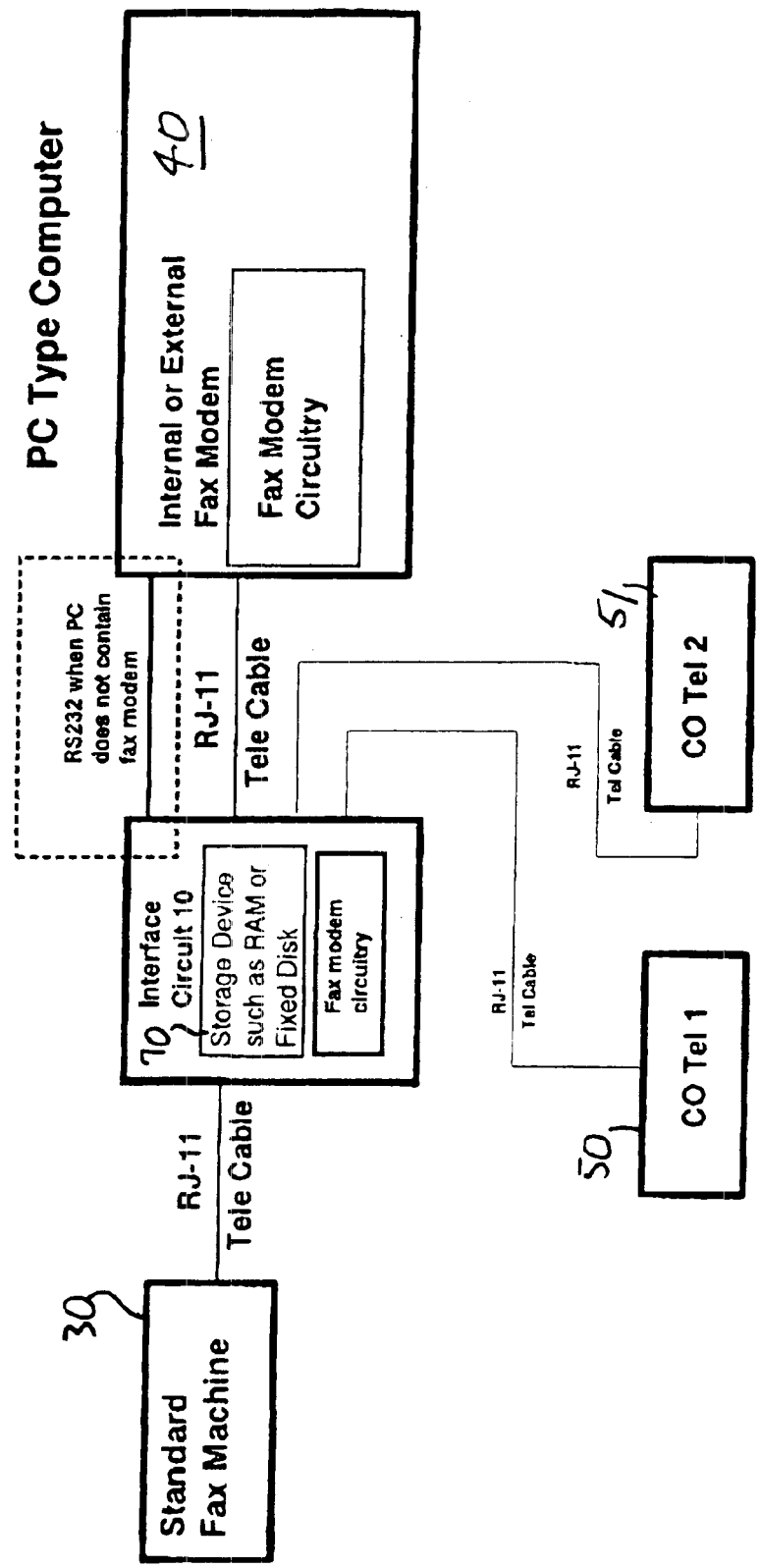

As shown in FIG. 2i, a RAM and/or Fixed Disk 70 may be incorporated into the interface 10, integrated with a fax modem 30 to allow for the capture of images or documents for later transfer into the PC 40 or the facsimile machine 30, or for image enhancement within the interface configuration 10. The addition of the data storage feature is particularly desirable for the fax machine or fax modem when they are in normal fax send or receive modes.

Optionally, the data storage feature is desirable for field application usage where information may be downloaded from a PC and stored in interface 10 for later transfer to a facsimile machine or a PC. Storage would be retained in this instance by battery backup incorporated in the RAM memory 70. Battery backup is not necessary for fixed disk storage.

FIG. 2j shows an arrangement for automated scanning and printing functions between a fax modem and a fax machine.

As represented in FIGS. 2a–2f, in order to activate an automated process for scanning or printing, the ring circuit 4 (FIG. 1) interfaces with the Tip and Ring features of the fax modem or fax machine. This is dependent on keying in a code on the fax keypad, such as ## or #* or any other predetermined code in order to respectively identify the scanning and printing functions. Interface 10 detects the tones generated by the inserted code (at the tone receiver 25 and generates a ring signal. The ring signal is detected and interpreted by the ring detect circuit of the fax modem or the fax machine. The fax modem or fax machine then generates receive signals or tones which indicate a connection. The fax modem or fax machine commences the scanning of the fax image or print cycle.

By depressing a predetermined code such as ## on the fax machine key pad, the tone detector circuit 25 interprets this code, enabling a control circuit to activate first (26) and second (27) relay means. Relay 26 disconnects the fax machine and the fax modem (connected to the PC) from the Central Office terminal lines. Relay 27, then connects 9V to the ring generator circuit 14 causing a sinusoidal ring signal of a predetermined frequency and amplitude to be generated to the PC fax modem. The PC fax modem answers and starts the scanning process from the fax machine to the PC.

A communication program stored in the PC allows the code #* (for example) to be entered, generating the tone signal from the fax modem. The tone detector circuit in the interface 10 interprets this code, enabling a control circuit to activate first (26) and second (27) relay means. Relay 26 disconnects the fax machine and the fax modem (connected to the PC) from the Central Office terminal lines. Relay 27, then connects 9V to the ring generator circuit 14 causing a sinusoidal ring signal of a predetermined frequency and amplitude to be generated to the fax machine. The fax machine answers and starts the printing process form the PC fax modem.

The switch version does not require the ## or #* or any other code, but activates the automated scanning/printing by pressing the ringer button B2.

The provision of the scan and print functions internal to the facsimile machine may also be accomplished by utilizing the analog output of the optical scanning circuit 75 of the facsimile machine (FIG. 2g). The analog signals are processed by the control/modem circuitry 76 where they are converted into a digital serial signal and then transmitted through the RS 232 sending interconnect port, the signal is then received by an RS232 connector at the PC. The aforementioned procedure utilizes unused signal lines which are available on most modem chips such as the Rockwell chip series.

A send and receive driver software package then implements the following action. The receive driver software accepts the digital image for storage or processing as appropriate. This send/receive driver communications software package also has the ability to send a digital image to the facsimile machine for printing purposes. The facsimile machine's control/modem circuitry then processed by the print driver 77 for printing. This linkage method for scanning and printing utilizing a fax machine is particularly useful for a computer without a fax modem. Any available send/receive communications software package is acceptable.

The commands of ## or #* for sending and receiving are still appropriate for this application although any other desired commands may be selected.

Figure 1A:
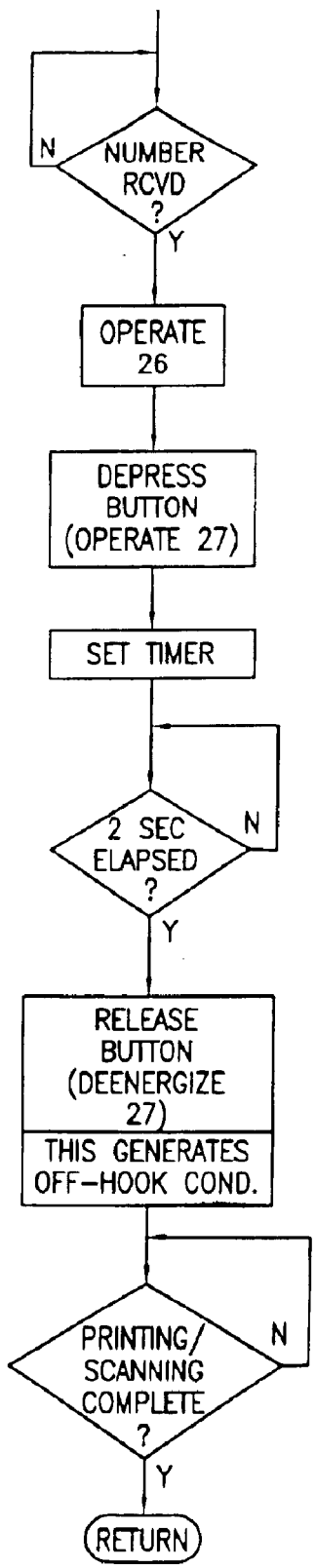
FIG. 1a is a flow diagram of the circuitry of FIG. 1 employing the microprocessor-based tone detecting circuit of FIG. 1.

For the automated operation, the circuitry 10 of FIG. 1 is provided with device 25 which includes an automatic tone detector circuit for receiving a unique number dialed by either the facsimile machine or the PC modem. Upon recognition of the unique number, as set forth above or by generation using other techniques, the tone receiver operates a driver circuit 26 for operating switch SW2 to decouple the PC and the facsimile machine from their associated telephone lines and for connecting the PC to the facsimile machine. Driver circuit 26 may be a relay or its equivalent for operating an armature (not shown) to move the switch arms between their two operating states. Driver unit 27 which likewise may be a relay or its equivalent, operates the switch SW1 to the position energizing the ringing circuit 14. A timer is set and when two seconds elapses, unit 27 is deenergized causing the off-hook signal to be generated by current generator circuit 12 through the release of the operating button. When printing or scanning is complete, the tone receiver unit is reset. A simplified flow diagram of the aforementioned operation is shown in FIG. 1a.

The circuitry of the present invention is highly simplified in design and provides effective communication between the PC and local facsimile machine enabling the local facsimile machine to provide the dual functions of operating independently for transmission or reception to remote facsimile machines as well as functioning as a scanner or printer with a local PC. The circuitry of the present invention provides all the necessary signal conditions which lead the PC and local facsimile machine to believe that they are communicating with one another over a telephone line. The facsimile machine, although operating in its normal fashion, functions very effectively as a scanner or printer as and when needed and provides a scanning or printing capability at a mere fraction of the cost of conventional scanners or printers.

Simple switching of SW2 returns the PC and facsimile machine to normal use.

The novel ring circuit provides the required ring signal which is conventional in present-day facsimile transmission application through the employment of an inexpensive, low voltage, DC battery or 9V power source and, through the operation of two switches incorporated in the novel interface circuitry of the present invention, followed by operation of the facsimile start switch, provides an interface circuit which is extremely easy to use and which eliminates the need for more complicated and expensive microprocessor-based devices.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A method of creating a scanning capability from a facsimile machine to a computer, with scanned image digital data signals transmitted through a bi-directional connection via a passive link between the facsimile machine and the computer, comprising the steps of:

by-passing or isolating the facsimile machine and the computer from the public network telephone line;

coupling the facsimile machine to the computer;

conditioning the computer to receive digital facsimile signals representing data on a scanned document; and conditioning the facsimile machine to transmit digital signals representing data on a scanned document to the computer, said computer being equipped with send/receive driver communications software enabling the reception of scanned image signals from the facsimile machine, said transmitted digital facsimile signals being received directly into the computer through the bi-directional direct connection via the passive link, thereafter, said computer processing the received digital facsimile signals of the scanned document as needed.

2. The method of claim 1 to create a scanning capability through a bi-directional direct connection via a passive link between a facsimile machine and a computer by transfer of scanned image data signals from the facsimile machine through said connection, said facsimile machine by-passing or isolated from the public network telephone line, and connected to an appropriate receiving port of a computer or other office product capable of receiving and processing said signals.

3. The method of claim 1, including transferring a parallel data source signal of a scanned image from said facsimile machine to said computer.

4. The method of claim 1, including transferring a digital serial data source signal of a scanned image from said facsimile machine to said computer.

5. The method of claim 1 further comprising optically recognizing the scanned data within the computer and converting the scanned data into character codes within the computer, said computer being equipped with Optical Character Recognition Software.

6. A method of creating a scanning capability from a facsimile machine to a computer equipped with a modem, with scanned image data signals transferred through a bi-directional direct connection via a passive link between the facsimile machine and the computer, comprising the steps of:

by-passing or isolating the facsimile machine and the computer from the public network telephone line;

coupling the facsimile to the computer;

conditioning the computer to receive facsimile signals representing data on a scanned document; and conditioning the facsimile machine to transmit signals representing data on a scanned document to the computer, said computer being equipped with send/receive driver communications software enabling the reception of scanned image signals from the facsimile machine, said transmitted facsimile signals being received through the bi-directional direct connection via the passive link to the computer modem, thereafter, said computer processing the received facsimile signals of the scanned document as needed.

7. A method of making a facsimile machine operable as a scanner and printer for a personal computer, by transferring digital data through a bi-directional direct connection via a passive link between the facsimile machine and the computer, each of the facsimile machine and personal computer for communicating normally using at least one public network telephone line, comprising the steps of:

configuring the facsimile machine to communicate with the personal computer using a digital connector port of the facsimile machine and personal computer, with both the facsimile machine and personal computer isolated from said at least one public network telephone line;

arranging the facsimile machine to be in a digital connection mode; and shifting the personal computer to a connected mode for sending or receiving digital signals through the bi-directional direct connection via the passive link for scanning and printing between the computer and the facsimile machine, in a facsimile format, using the digital connector port of the personal computer, said computer being equipped with send/receive driver communications software enabling the transfer of the scanning and printing signals between the computer and the facsimile machine.

8. The method of claim 7 including using RS 232 connector ports to interface between the facsimile machine and the personal computer.

9. The method of claim 7 including using parallel connector ports to interface between the facsimile machine and the personal computer.

10. The method of claim 7, using RS 232, parallel or other suitable digital port type connectors to interface between said facsimile machine and said computer.

11. The method of claim 7 further comprising optically recognizing the scanned data within the computer and converting the scanned data into character codes within the computer, said computer being equipped with Optical Character Recognition Software.

12. A method of using a facsimile machine as a scanner and printer by transferring data signals through a bi-directional direct connection via a passive link between the facsimile machine and the personal computer, each of the facsimile machine and personal computer for communicating using telephone types of circuits, said facsimile machine and computer being isolated from the public telephone network, comprising the steps of:

(a) configuring the facsimile machine to communicate with the personal computer using the facsimile machine, and by-passing or isolating the facsimile machine and computer from the public telephone network;

(b) arranging the facsimile machine to be in a simulated off-hook condition, or connection mode; and (c) shifting the personal computer to an off-hook condition, or connection mode for sending or receiving signals in facsimile formats through the bi-directional direct connection via the passive link between the personal computer and the facsimile machine;

said computer being equipped with send/receive driver communications software enabling the transfer of the scanning and printing signals between the computer and the facsimile machine.

13. The method of claim 12 including using serial data transmissions for both scanning and printing through the bi-directional direct connection via the passive link between the facsimile machine and the personal computer.

14. The method of claim 12 including using parallel data transmissions for both scanning and printing through the bi-directional direct connection via the passive link between the facsimile machine and the personal computer.

15. The method of claim 12 including using analog data transmissions for both scanning and printing through the bi-directional direct connection via the passive link between the facsimile machine and the personal computer.

16. The method of claim 12 using analog or digital serial, parallel data transmissions, for both scanning and printing through the bi-directional direct connection via the passive link, between the facsimile machine and the personal computer.

17. The method of claim 12 further comprising optically recognizing the scanned data within the computer and converting the scanned data into character codes within the computer, said computer being equipped with Optical Character Recognition Software.

18. A method of using a facsimile machine with a computer, one or both of which being connected to a telephone line such that said facsimile machine operates as a scanning and printing device for the computer when isolated from the telephone line comprising the steps of:

(a) coupling the facsimile machine to the computer through a bi-directional direct connection via a passive link;

(b) generating a signal to simulate an off-hook condition or connection mode providing a direct path whereby the facsimile machine is conditioned to transmit or receive signals through the bi-directional direction via the passive link to the computer;

(c) generating a facsimile machine signal whereby the computer is conditioned to receive signals representing data on a scanned document; and (d) generating a computer signal whereby the facsimile machine is conditioned to receive signals representing data on a document to be printed;

said computer being equipped with send/receive driver communications software enabling the reception of scanned image signals from the facsimile machine or the sending of computer data to the facsimile machine for printing.

19. A method of using a facsimile machine with a computer, one or both of which being connected to a telephone line such that said facsimile machine operates as a printing device for the computer when isolated from the telephone line, comprising the steps of:

(a) coupling the facsimile machine to the computer through a bi-directional direct connection via a passive link, which enables transfer of digital image signals in both directions;

(b) generating a signal representative of a facsimile machine communications signals, whereby the computer is conditioned to transmit signals representing data on a document to be printed; and (c) generating a signal to simulate an off-hook condition or connection mode providing a direct path whereby the facsimile machine is conditioned to receive signals through the bi-directional direct connection via the passive link representing data from the computer of a document to be printed.

20. A method of making a facsimile machine operable as a scanner and printer for a computer, each of the facsimile machine and computer for communicating normally using at least one public network telephone line, comprising the steps of:

(a) configuring the facsimile machine to communicate with the personal computer through a bi-directional direct connection via a passive link between a digital connector port on the facsimile machine and a digital connector port on the computer, with both the facsimile machine and computer by-passing or isolated from said at least one public network telephone line;

(b) arranging the facsimile machine to send or receive digital data signals; and (c) coupling the digital data signals through the bi-directional direct connection via the passive link between the personal computer and the facsimile machine;

said computer being equipped with send/receive driver communications software enabling the reception of scanned image signals from the facsimile machine or the sending of computer data to the facsimile machine for printing.

* * * * *

UNITED STATES PATENT AND TRADEMARK OFFICE
CERTIFICATE OF CORRECTION

PATENT NO. : 6,894,811 B1
APPLICATION NO. : 08/669056
DATED : May 17, 2005
INVENTOR(S) : Bruce Nachman It is certified that error appears in the above-identified patent and that said Letters Patent is hereby corrected as shown below:

Drawings

Figure 2j was resubmitted by hand to the examiner at the Interview of 4/14/04, however, it was not incorporated into the issued patent. An additional copy is attached herewith as 4 of 4.

The Specification correction now requires:

Column 8, line 21, after "circuitry" insert --76 receives the digital image and it is--

Claim 1, Column 9, line 19, change "a bi-directional connection" to --a bi-directional --direct-- connection--

Claim 18, Column 11, line 43, change "direction" to --direct connection--

Signed and Sealed this

Tenth Day of June, 2008

JON W. DUDAS
*Director of the United States Patent and Trademark Office*

UNITED STATES PATENT AND TRADEMARK OFFICE
CERTIFICATE OF CORRECTION

PATENT NO.        : 6,894,811 B1
APPLICATION NO.   : 08/669056
DATED             : May 17, 2005
INVENTOR(S)       : Bruce Nachman It is certified that error appears in the above-identified patent and that said Letters Patent is hereby corrected as shown below:

In Drawings insert as Page 12 of 12

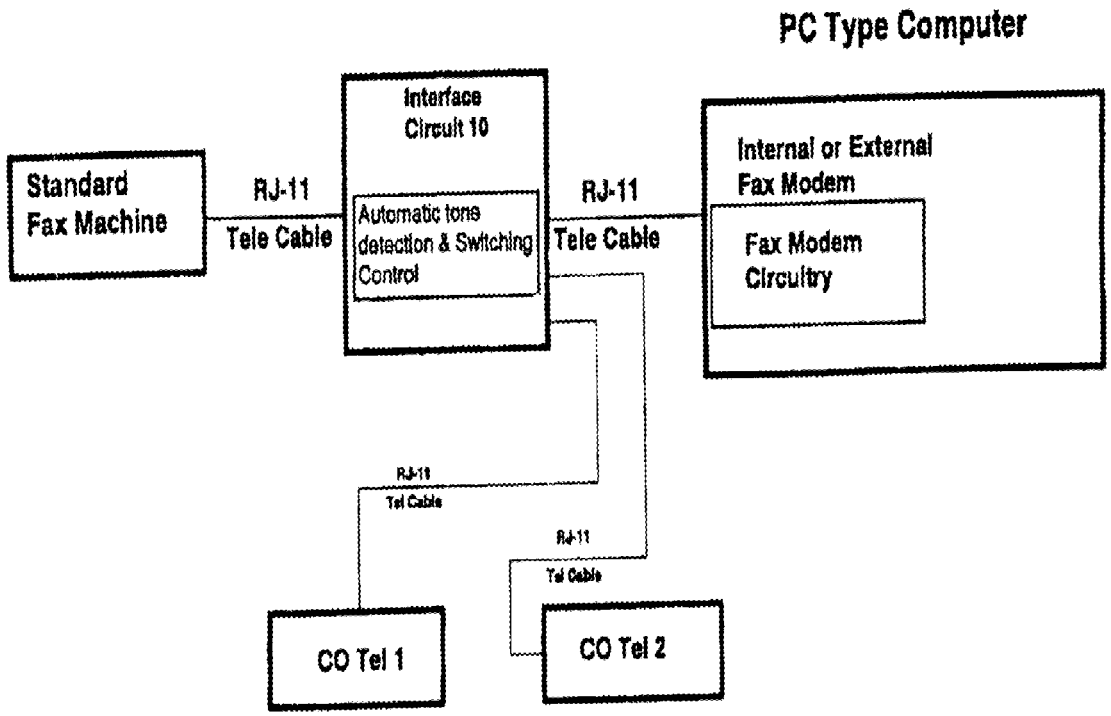

Fig. 2j

UNITED STATES PATENT AND TRADEMARK OFFICE
CERTIFICATE OF CORRECTION

| | | |
|---|---|---|
| PATENT NO. | : 6,894,811 C1 | |
| APPLICATION NO. | : 90/009901 | |
| DATED | : July 31, 2012 | |
| INVENTOR(S) | : Bruce Nachman | |

It is certified that error appears in the above-identified patent and that said Letters Patent is hereby corrected as shown below:

Column 1, lines 34-35, "unmodified standard protocol" should read
--generic--

Column 1, lines 57-58, "unmodified standard protocol" should read
--generic--

Column 3, lines 4-5, "unmodified standard protocol" should read
--generic--

Column 3, line 27, "unmodified standard protocol" should read
--generic--

Column 4, lines 22-23, "unmodified standard protocol" should read
--generic--

Signed and Sealed this
Twelfth Day of March, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,894,811 C1 | Page 1 of 1 |
| APPLICATION NO. | : 90/009901 | |
| DATED | : July 31, 2012 | |
| INVENTOR(S) | : Bruce Nachman | |

It is certified that error appears in the above-identified patent and that said Letters Patent is hereby corrected as shown below:

In the Specification

Column 1, lines 34-35, "unmodified standard protocol" should read
--generic--

Column 1, lines 57-58, "unmodified standard protocol" should read
--generic--

Column 3, lines 4-5, "unmodified standard protocol" should read
--generic--

Column 3, line 26, after "printed," should read
--wherein the computer is equipped with generic send/receive driver communications software to send the digital image signals to the facsimile machine for printing.--

Column 4, lines 22-23, "unmodified standard protocol" should read
--generic--

This certificate supersedes the Certificate of Correction issued March 12, 2013.

Signed and Sealed this
Twenty-second Day of July, 2014

Michelle K. Lee
*Deputy Director of the United States Patent and Trademark Office*

US006894811C1

(12) EX PARTE REEXAMINATION CERTIFICATE (9159th)
United States Patent
Nachman et al.

(10) Number: US 6,894,811 C1
(45) Certificate Issued: Jul. 31, 2012

(54) INTERFACE CIRCUIT FOR UTILIZING A FACSIMILE COUPLED TO A PC AS A SCANNER OR PRINTER

(75) Inventors: Bruce Nachman, deceased, late of Wayne, PA (US); Marvin Nachman, legal representative, Villanova, PA (US)

(73) Assignee: Infinity Computer Products, Inc., Villanova, PA (US)

Reexamination Request:
No. 90/009,901, Apr. 19, 2011

Reexamination Certificate for:
Patent No.: 6,894,811
Issued: May 17, 2005
Appl. No.: 08/669,056
Filed: Jun. 24, 1996

Certificate of Correction issued Jun. 10, 2008.

Related U.S. Application Data

(63) Continuation-in-part of application No. 08/226,278, filed on Apr. 11, 1994, now Pat. No. 5,530,558.

(51) Int. Cl.
*H04N 1/32* (2006.01)
*H04N 1/04* (2006.01)

(52) U.S. Cl. ........................ 358/442; 358/468; 358/474; 379/100.01

(58) Field of Classification Search ........................ None
See application file for complete search history.

(56) References Cited

To view the complete listing of prior art documents cited during the proceeding for Reexamination Control Number 90/009,901, please refer to the USPTO's public Patent Application Information Retrieval (PAIR) system under the Display References tab.

*Primary Examiner* — Colin LaRose

(57) ABSTRACT

Apparatus for interfacing a conventional facsimile machine with a PC enabling the use of the facsimile machine as a scanner or printer. A first switch assembly selectively couples the PC modem and facsimile machine either to independent telephone lines in a normal mode or to one another in a scan/print mode. A manually operated switch assembly is depressed for a brief interval sufficient to activate a ringing circuit which converts DC power from a small battery source to a 20 Hz sine wave of 90 volt amplitude and applies the sine wave signal to the PC to cause the PC or facsimile to enter into a scan or print mode, respectively. The manually operable switch is then released to apply a constant current to the facsimile machine to simulate an off-hook condition. A facsimile machine start button is then operated to start the facsimile machine which scans documents provided therein and transmits the scanned data in a conventional facsimile transmission format or activate the PC to transmit a fax in conventional facsimile transmission format to utilize the facsimile machine as a printer. The PC may be equipped with a suitable software program for converting non-graphic, i.e. such as word-type information into a binary format suitable for use in word processing applications and may store the data in a memory for subsequent use. An automatic circuit may be provided to initiate a scanning or printing mode responsive to receipt of a unique number received from either the facsimile machine or the PC, thus eliminating the need for switches.

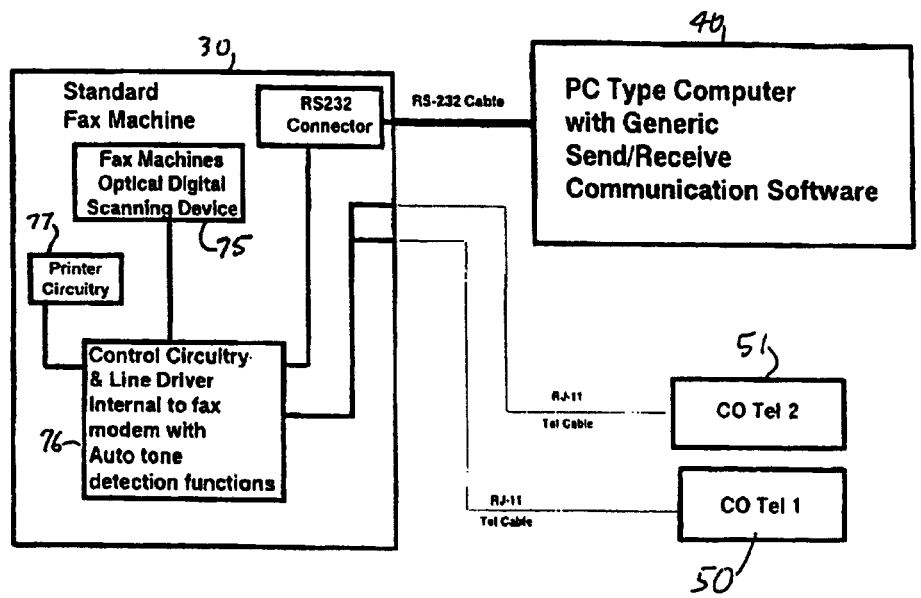

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 7, 12 and 18-20 are determined to be patentable as amended.

Claims 2-5, 8-11 and 13-17 dependent on an amended claim, are determined to be patentable.

1. A method of creating a scanning capability from a facsimile machine to a computer, with scanned image digital data signals transmitted through a bi-directional direct connection via a passive link between the facsimile machine and the computer, comprising the steps of:
by-passing or isolating the facsimile machine and the computer from the public network telephone line;
coupling the facsimile machine to the computer;
conditioning the computer to receive digital facsimile signals representing data on a scanned document; and
conditioning the facsimile machine to transmit digital signals representing data on a scanned document to the computer, said computer being equipped with *unmodified standard protocol* send/receive driver communications software enabling the reception of scanned image signals from the facsimile machine, said transmitted digital facsimile signals being received directly into the computer through the bi-directional direct connection via the passive link, thereafter, said computer processing the received digital facsimile signals of the scanned document as needed.

6. A method of creating a scanning capability from a facsimile machine to a computer equipped with a modem, with scanned image data signals transferred through a bi-directional direct connection via a passive link between the facsimile machine and the computer, comprising the steps of:
by-passing or isolating the facsimile machine and the computer from the public network telephone line;
coupling the facsimile to the computer;
conditioning the computer to receive facsimile signals representing data on a scanned document; and
conditioning the facsimile machine to transmit signals representing data on a scanned document to the computer, said computer being equipped with *unmodified standard protocol* send/receive driver communications software enabling the reception of scanned image signals from the facsimile machine, said transmitted facsimile signals being received through the bi-directional direct connection via the passive link to the computer modem, thereafter, said computer processing the received facsimile signals of the scanned document as needed.

7. A method of making a facsimile machine operable as a scanner and printer for a personal computer, by transferring digital data through a bi-directional direct connection via a passive link between the facsimile machine and the computer, each of the facsimile machine and personal computer for communicating normally using at least one public network telephone line, comprising the steps of:
configuring the facsimile machine to communicate with the personal computer using a digital connector port of the facsimile machine and personal computer, with both the facsimile machine and personal computer isolated from said at least one public network telephone line;
arranging the facsimile machine to be in a digital connection mode; and
*using an unmodified standard protocol for* shifting the personal computer to a connected mode for sending or receiving digital signals through the bi-directional direct connection via the passive link for scanning and printing between the computer and the facsimile machine, in a facsimile format, using the digital connector port of the personal computer, said computer being equipped with send/receive driver communications software enabling the transfer of the scanning and printing signals between the computer and the facsimile machine.

12. A method of using a facsimile machine as a scanner and printer by transferring data signals through a bi-directional direct connection via a passive link between the facsimile machine and the personal computer, each of the facsimile machine and personal computer for communicating using telephone types of circuits, said facsimile machine and computer being isolated from the public telephone network, comprising the steps of:
(a) configuring the facsimile machine to communicate with the personal computer using the facsimile machine, and by-passing or isolating the facsimile machine and computer from the public telephone network;
(b) arranging the facsimile machine to be in a simulated off-hook condition, or connection mode; and
(c) *using an unmodified standard protocol for* shifting the personal computer to an off-hook condition, or connection mode for sending or receiving signals in facsimile formats through the bi-directional direct connection via the passive link between the personal computer and the facsimile machine;
said computer being equipped with send/receive driver communications software enabling the transfer of the scanning and printing signals between the computer and the facsimile machine.

18. A method of using a facsimile machine with a computer, one or both of which being connected to a telephone line such that said facsimile machine operates as a scanning and printing device for the computer when isolated from the telephone line comprising the steps of:
(a) coupling the facsimile machine to the computer through a bi-directional direct connection via a passive link;
(b) generating a signal to simulate an off-hook condition or connection mode providing a direct path whereby the facsimile machine is conditioned to transmit or receive signals through the bi-directional direct connection via the passive link to the computer;
(c) generating a facsimile machine signal whereby the computer is conditioned to receive signals representing data on a scanned document; and (d) generating a computer signal whereby the facsimile machine is conditioned to receive signals representing data on a document to be printed;

said computer being equipped with *unmodified standard protocol* send/receive driver communications software enabling the reception of scanned image signals from the facsimile machine or the sending of computer data to the facsimile machine for printing.

19. A method of using a facsimile machine with a computer, one or both of which being connected to a telephone line such that said facsimile machine operates as a printing device for the computer when isolated from the telephone line, comprising the steps of:

(a) coupling the facsimile machine to the computer through a bi-directional direct connection via a passive link, which enables transfer of digital image signals in both directions;

(b) generating a signal representative of a facsimile machine communications signals, whereby the computer is conditioned to transmit signals representing data on a document to be printed; and (c) generating a signal to simulate an off-hook condition or connection mode providing a direct path whereby the facsimile machine is conditioned to receive signals through the bi-directional direct connection via the passive link representing data from the computer of a document to be printed, *wherein the computer is equipped with unmodified standard protocol send/ receive driver communication software.*

20. A method of making a facsimile machine operable as a scanner and printer for a computer, each of the facsimile machine and computer for communicating normally using at least one public network telephone line, comprising the steps of:

(a) configuring the facsimile machine to communicate with the personal computer through a bi-directional direct connection via a passive link between a digital connector port on the facsimile machine and a digital connector port on the computer, with both the facsimile machine and computer by-passing or isolated from said at least one public network telephone line;

(b) arranging the facsimile machine to send or receive digital data signals; and (c) coupling the digital data signals through the bi-directional direct connection via the passive link between the personal computer and the facsimile machine;

said computer being equipped with *unmodified standard protocol* send/receive driver communications software enabling the reception of scanned image signals from the facsimile machine or the sending of computer data to the facsimile machine for printing.

* * * * *

US006894811C2

(12) EX PARTE REEXAMINATION CERTIFICATE (10087th)
United States Patent
Nachman

(10) Number: US 6,894,811 C2
(45) Certificate Issued: Mar. 25, 2014

(54) INTERFACE CIRCUIT FOR UTILIZING A FACSIMILE COUPLED TO A PC AS A SCANNER OR PRINTER

(75) Inventors: Bruce Nachman, Wayne, PA (US); Marvin Nachman, legal representative, Villanova, PA (US)

(73) Assignee: Infinity Computer Products, Inc., Villanova, PA (US)

Reexamination Request:
No. 90/012,816, Mar. 22, 2013

Reexamination Certificate for:
Patent No.: 6,894,811
Issued: May 17, 2005
Appl. No.: 08/669,056
Filed: Jun. 24, 1996

Reexamination Certificate C1 6,894,811 issued Jul. 31, 2012

Certificate of Correction issued Jun. 10, 2008
Certificate of Correction issued Mar. 12, 2013

Related U.S. Application Data

(63) Continuation-in-part of application No. 08/226,278, filed on Apr. 11, 1994, now Pat. No. 5,530,558.

(51) Int. Cl.
*H04N 1/32* (2006.01)
*H04N 1/04* (2006.01)
*H04N 1/00* (2006.01)

(52) U.S. Cl.
USPC ....... 358/442; 358/468; 358/474; 379/100.01

(58) Field of Classification Search
None
See application file for complete search history.

(56) References Cited

To view the complete listing of prior art documents cited during the proceeding for Reexamination Control Number 90/012,816, please refer to the USPTO's public Patent Application Information Retrieval (PAIR) system under the Display References tab.

*Primary Examiner* — Mark Sager

(57) ABSTRACT

Apparatus for interfacing a conventional facsimile machine with a PC enabling the use of the facsimile machine as a scanner or printer. A first switch assembly selectively couples the PC modem and facsimile machine either to independent telephone lines in a normal mode or to one another in a scan/print mode. A manually operated switch assembly is depressed for a brief interval sufficient to activate a ringing circuit which converts DC power from a small battery source to a 20 Hz sine wave of 90 volt amplitude and applies the sine wave signal to the PC to cause the PC or facsimile to enter into a scan or print mode, respectively. The manually operable switch is then released to apply a constant current to the facsimile machine to simulate an off-hook condition. A facsimile machine start button is then operated to start the facsimile machine which scans documents provided therein and transmits the scanned data in a conventional facsimile transmission format or activate the PC to transmit a fax in conventional facsimile transmission format to utilize the facsimile machine as a printer. The PC may be equipped with a suitable software program for converting non-graphic, i.e. such as word-type information into a binary format suitable for use in word processing applications and may store the data in a memory for subsequent use. An automatic circuit may be provided to initiate a scanning or printing mode responsive to receipt of a unique number received from either the facsimile machine or the PC, thus eliminating the need for switches.

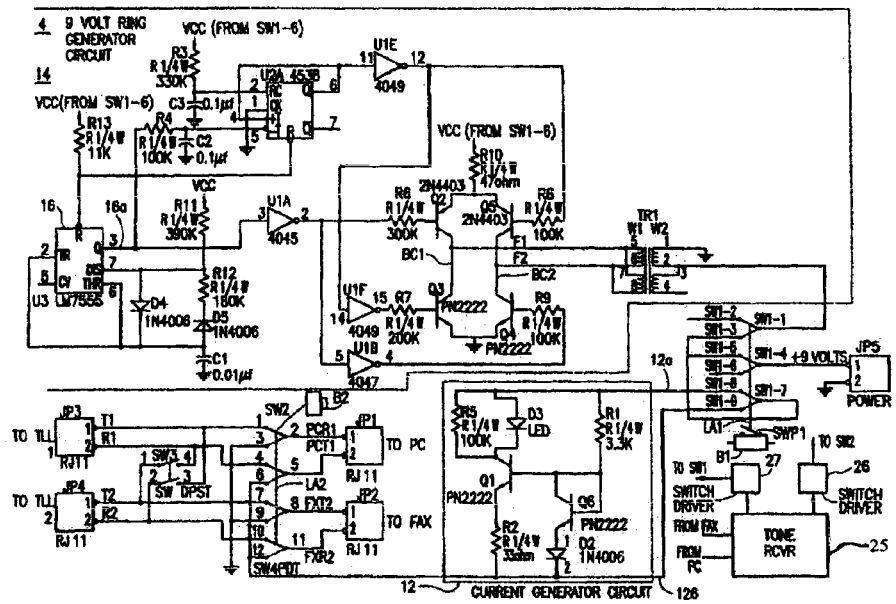

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

\* \* \* \* \*